March 28, 1967 P. B. EYRE 3,311,541
NUCLEAR REACTOR FUEL ELEMENTS
Filed Aug. 12, 1965 2 Sheets-Sheet 1

March 28, 1967 P. B. EYRE 3,311,541
NUCLEAR REACTOR FUEL ELEMENTS
Filed Aug. 12, 1965 2 Sheets-Sheet 2
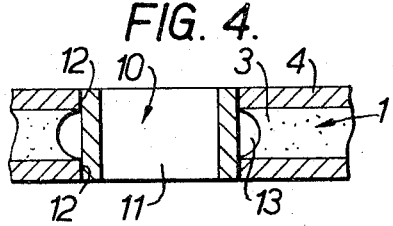
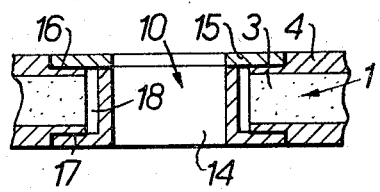
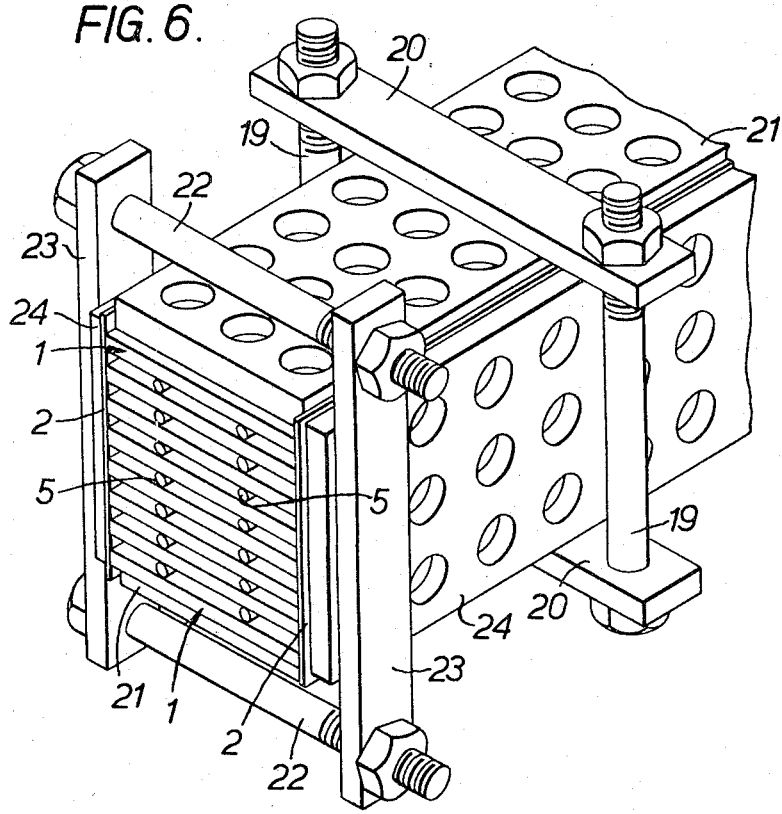

United States Patent Office 3,311,541
Patented Mar. 28, 1967

3,311,541
NUCLEAR REACTOR FUEL ELEMENTS
Philip Bernard Eyre, Lytham, near Blackpool, England, assignor to United Kingdom Atomic Energy Authority, London, England
Filed Aug. 12, 1965, Ser. No. 479,174
Claims priority, application Great Britain, Sept. 21, 1964, 38,486/64
3 Claims. (Cl. 176—75)

This invention relates to nuclear fuel elements and in particular to plate assembly type fuel elements having a plurality of parallel arranged fuel plates affixed between two side plates.

Plate type fuel elements commonly used in nuclear reactors normally include fuel plates of fissionable material clad in a non-fissile corrosion resistant material such as aluminium or stainless steel. The fuel plates are fixed parallel but spaced one from another to define passages for coolant between the plates.

Where the fuel plates are manufactured by rolling of clad fissile material, the longitudinal edges of the plates are normally cropped to remove any transverse curvature occurring in the plane of the plates during rolling. Thus the fissile material is exposed along the longitudinal edges of the fuel plates. In the brazed assembly the longitudinal edges of the fuel plates are sealed by being brazed to the side plates. In order to prevent contact between reactor coolant and the fissile material in the fuel plates the brazes between the longitudinal edges of the fuel plates and the side plates must be of high integrity without the existence of faults which will allow leakage of the reactor coolant into contact with the fissile material in the fuel plates.

In a particular form of plate type fuel element holes are pierced in the fuel plates for transfer of coolant between the coolant passageways defined between the fuel plates. Cutting of holes in the plates exposes the fissile material in the plates at the internal edges of the holes and in order to prevent contact between reactor coolant and the fissile material, the internal edges of the holes are sealed by liner tubes which are brazed in the holes. The brazing of the liner tubes in the holes must also be of high integrity to prevent leakage of the reactor coolant into contact with the fissile material at the edges of the holes in the fuel plates.

It is therefore an object of the present invention to provide means to enable leak testing of the brazes between the longitudinal edges of the fuel plates and the side plates of a plate type fuel element.

According to this aspect of the invention a plate type fuel element comprising an assembly of prallel fuel plates brazed along their longitudinal edges between side plates has leak testing grooves along the longitudinal edges of the fuel plates, the grooves being formed in the fuel material exposed between the cladding at the longitudinal edges of the fuel plates prior to brazing the fuel plates to the side plates.

Another object of the invention is to provide means enabling leak testing of brazes sealing liner tubes in coolant transfer holes in the fuel plates of a plate type fuel element.

According to this aspect of the invention where the liner tubes are a close fit in the coolant transfer holes in the fuel plates the coolant transfer holes have annular grooves around their internal edges the annular grooves being formed in the fissile material exposed at the internal edges of the holes in the fuel plates prior to brazing the liner tubes in the holes.

Alternatively the liner tubes for the holes in the fuel plates may be of smaller external diameter than the internal diameter of the holes in the fuel plates so as to define an annular gap between the internal edges of the holes and the liner tubes, the ends of the annular gap being sealed by annular rings brazed between the internal edges of the holes in the fuel plates and the ends of the liner tubes.

The presence of the grooves in the longitudinal edges of the fuel plates enables a general leak testing procedure to be carried out wherein, for example, the fuel element after brazing is immersed in helium under pressure. Any faults in the brazes between the edges of the fuel plates and the side plates allows ingress of helium through such faults into the grooves along the edges of the fuel plates corresponding to the faulty brazes. The fuel element is now placed in a test chamber which is evacuated and then connected to a mass spectrometer. Faults in the brazes between the edges of the fuel plates and the side plates are indicated by helium leakage by the mass spectrometer.

The presence of grooves around the internal edges of coolant transfer holes in the fuel plates or the provision of an annular gap between the internal edges of such coolant transfer holes and the liner tubes for the holes also enables similar leak testing of the brazes sealing the liner tubes in the coolant transfer holes.

If the above described general leak testing procedure indicates the presence of faults in the brazes between the longitudinal edges of the fuel plates and the side plates such faults can be specifically located by a helium probing procedure. Each of the grooves along the longitudinal edges of the fuel plates is connected with the vacuum system of a mass spectrometer by way of test holes drilled through the side plates into the grooves. A helium probe is passed along the brazes between the edges of the fuel plates and the side plates. If a fault exists in any of the brazes helium passes through the fault into the groove along the edge of the corresponding fuel plate and from thence to the mass spectrometer where the helium is detected to provide indication of the presence and location of the fault in the braze. Located faults are then eliminated by a localized brazing treatment and the test holes in the side plates closed by spot welding.

The invention will now be described by way of example with reference to the accompanying drawings in which:

FIGURES 3 and 4 are isometric details of parts of the fuel element shown in FIGURE 1, FIGURE 5 is an alternative form of the detail of the fuel element shown in FIGURE 4, FIGURE 6 is an isometric view of one end of a plate type fuel element clamped for brazing.

Figure 1:
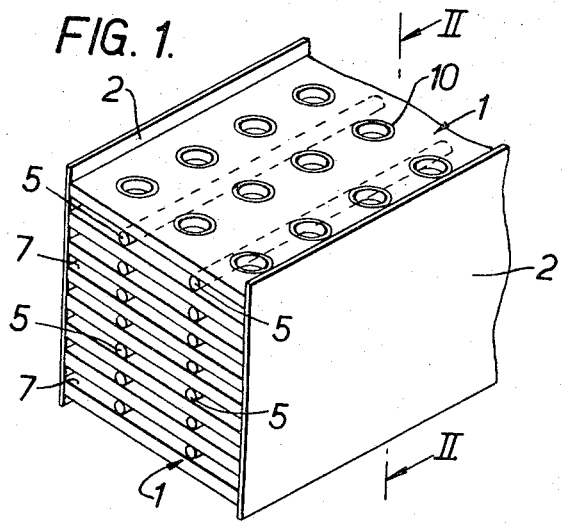
FIGURE 1 is an isometric view of one end of a plate type fuel element.
Figure 2:
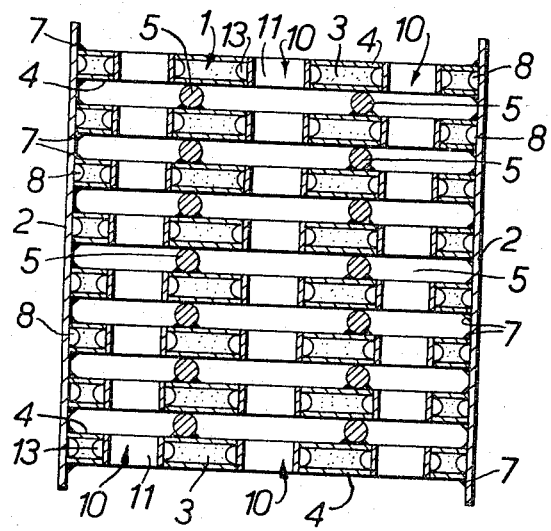
FIGURE 2 is a cross section along the line II—II in FIGURE 1.
Figure 3:
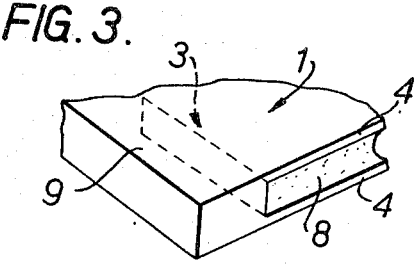

The plate type fuel element shown in FIGURES 1 and 2 comprises an assembly of eight fuel plates 1 arranged parallel one to another between parallel side plates 2. The fuel plates 1 are for example of a cermet 3 of 30 volume percent $UO_2$ in 70 volume percent stainless steel with an external cladding 4 of stainless steel 0.010 inch thick. Typically the fuel plates 1 are 2¼ inches wide and 20 inches long. The side plates 2 are, for example, of stainless steel 0.010 inch thick. To one side of each fuel plate 1 are brazed two longitudinally disposed stainless steel spacing wires 5 and the side plates 2 are joined to the longitudinal edges of the fuel plates 1 by brazes 7 to hold the fuel plates 1 in their relative positions set by the spacing wires 5. The brazes 7 also seal the longitudinal edges of the fuel plates 1 preventing contact between coolant and the cermet fuel 3 in use of the fuel element in a nuclear reactor. Prior to assembly of the fuel element, grooves 8 are cut in the exposed cermet 3 along the longitudinal edges 6 of the fuel plates 1. The grooves 8 are typically 0.060 inch wide and 0.040 inch deep. As shown in FIGURE 3, which is a detail of one corner of a fuel plate 1, the grooves 8 terminate near the ends 9 of the fuel plates 1, the ends 9 of the fuel plates 1 being of solid cladding material.

Holes 10 for coolant transfer are provided in the fuel plates 1. Cutting of the holes 10 in the fuel plates 1 exposes the cermet fuel 3. Therefore as shown in FIGURE 4 the internal edges of the holes 10 are sheathed by stainless steel liner tubes 11 sealed by brazes 12 in the holes 10. Prior to sealing the internal edges of the holes 10 by brazing of the tubes 11, an annular groove 13 is cut in the exposed cermet 3 around the internal edge of each hole 10.

FIGURE 5 shows an alternative arrangement for sealing of the internal edges of the holes 10. The area surrounding the internal edge of each hole 10 is reduced in thickness by coining and then the hole 10 is fitted with a flanged liner tube 14 and an annular ring 15 which are sealed in place by brazes 16 and 17. The liner tubes 14 are made of smaller diameter than the diameter of the holes 10 so that a closed annular space 18 is defined between the internal edge of each hole 10 and the corresponding liner tube 14.

In assembly of a fuel element such as shown in FIGURES 1 and 2 the spacing wires 5 are first brazed to the individual fuel plates 1. The spacing wires 5 and the surfaces of the fuel plates 1 are first cleaned by grit blasting followed by degreasing and the two spacing wires 5 are spot welded onto the surface of each plate 1 at the solid stainless steel ends 9 of the plate 1. A 13 percent chromium, 10 percent phosphorus, nickel based braze metal in the form of plastic bonded wire is cemented along the side of each spacing wire 5. The fuel plates 1 are stacked one upon another and pressure applied across the stack to keep the spacing wires 5 in contact with the plates 1 during brazing. To prevent adhesion where not required the reverse side of each of the fuel plates 1 is painted with a suitable "stop off" compound such as a mixture of titanium and calcium oxides in a volatile carrier liquid. Brazing is effected for example at 1000° C. under a high vacuum.

The fuel plates 1 with the attached spacing wires 5 are now assembled horizontally into a pack between the side plates 2. As each fuel plate 1 is placed in position between the side plates 2, a 13 percent chromium, 10 percent phosphorus, nickel based braze metal is applied from a syringe in the form of a plastic bonded suspension to the uppermost face of each fuel plate 1 only, where the longitudinal edges 6 of the fuel plates 1 come in contact with the side plates 2. Braze fillets are preformed with a small hand tool.

The accuracy of the fuel plates 1 and the spacing wires 5 make the assembly virtually self jigging but it is necessary to provide some form of clamping which is effective at the brazing temperature as the assembly relaxes on being heated. It has been found that an effective method is to use differential expansion effects to produce the required clamping action at the brazing temperature.

A suitable clamping arrangement is as shown in FIGURE 6. The pack of fuel plates 1 is clamped together by mild steel bolts 19 acting through stainless steel struts 20 and honeycombed stainless steel plates 21 applied top and bottom to the pack of fuel plates 1. Similarly the side plates 2 are clamped against the edges of the pack of fuel plates 1 by mild steel bolts 22 acting through stainless steel struts 23 and honeycombed stainless steel plates 24. By disposition of the mild steel bolts 19 and 22 to act in two planes the required clamping action is obtained.

The clamped assembly is brazed at 1000° C. in a stainless steel vacuum vessel using a conventional hot retort resistance furnace.

After brazing the assembly is unclamped and immersed in helium at a pressure of 100 pounds per square inch. If any faults exist in the brazes 7 between the edges of the fuel plates 1 and the side plates 2 then helium penetrates such faults and enters the grooves 8 in the edges of the fuel plates 1 corresponding to the faulty brazes 7. If any faults exist in the brazes 12 sealing the liner rings 11 in the holes 10 of the fuel plates 1 then helium penetrates such faults and enters the annular grooves 13 around the holes 10 having the faulty brazes 12. Likewise if, in the modification shown in FIGURE 5, any faults exist in the brazes 16 and 17 sealing the liner tubes 14 and rings 15 in the holes 10 of the fuel plates 1 then helium penetrates the faults and enters the closed annular spaces 18 defined between the liner tubes 14 and the internal edges of the holes 10.

The assembly is now placed in a vacuum vessel which is evacuated and connected with a mass spectrometer. Detection of helium leaking from the fuel element is a general indication of the presence of faulty brazes.

Faults in the brazes 7 between the longitudinal edges of the fuel plates 1 and the side plates 2 can be specifically located by a helium probing technique. Each of the grooves 8 along the longitudinal edges of the fuel plates 1 is connected to a mass spectrometer by way of test holes drilled through the side plates 2 into the grooves 8. As the mass spectrometer operates at a high vacuum the grooves 8 are evacuated. A helium probe is passed between the fuel plates 1 along the brazes 7 between the edges of the fuel plates 1 and the side plates 2. If a fault exists in any of the brazes 7 helium is drawn through the fault into the groove 8 along the edge of the corresponding fuel plate 1 and is detected by the mass spectrometer to provide indication of the presence and location of the fault in the braze 7. Located faults in the brazes 7 are then eliminated by localised brazing and the test holes in the side plates 2 are closed by spot welding.

I claim:
1. A plate type fuel element comprising an assembly of parallel fuel plates brazed at their longitudinal edges between side plates having leak testing grooves along the longitudinal edges of the fuel plates, the grooves being formed in the fuel material exposed between the cladding at the longitudinal edges of the fuel plates prior to brazing the fuel plates to the side plates.

2. A plate type fuel element comprising an assembly of parallel fuel plates pierced by coolant transfer holes, the internal edges of the coolant transfer holes being sealed by liner tubes brazed in the coolant transfer holes in which the liner tubes are a close fit, the coolant transfer holes in the fuel plates having annular leak testing grooves around their internal edges, the annular grooves being formed in the fissile material exposed at the inner edges of the coolant transfer holes prior to brazing the liner tubes in the holes.

3. A plate type fuel element comprising an assembly of parallel fuel plates pierced by coolant transfer holes, liner tubes being fitted in the coolant transfer holes in the fuel plates, the liner tubes being of smaller external diameter than the internal diameter of the coolant transfer holes in the fuel plates so as to define an annular leak testing gap between the internal edges of the coolant transfer holes and the liner tubes, the ends of the annular gap at the faces of the fuel plates being sealed by annular rings brazed between the internal edges of the coolant transfer holes in the fuel plates and the ends of the liner tubes.

References Cited by the Examiner

UNITED STATES PATENTS

| | | | |
|---|---|---|---|
| 2,777,812 | 1/1957 | Powell et al. | 176—80 X |
| 2,886,503 | 5/1959 | Szilard et al. | 176—72 X |
| 2,938,846 | 5/1960 | Hix et al. | 176—75 X |
| 3,231,476 | 1/1966 | Thome | 176—37 X |

CARL D. QUARFORTH, *Primary Examiner.*

BENJAMIN R. PADGETT, *Examiner.*

M. J. SCOLNICK, *Assistant Examiner.*